United States Patent
Van Der Sluis et al.

(10) Patent No.: US 9,430,406 B2
(45) Date of Patent: Aug. 30, 2016

(54) SYSTEM FOR GENERATING A CRYPTOGRAPHIC KEY FROM A MEMORY USED AS A PHYSICALLY UNCLONABLE FUNCTION

(71) Applicant: INTRINSIC ID B.V., Eindhoven (NL)

(72) Inventors: Erik Van Der Sluis, Utrecht (NL); Marten Van Hulst, Oisterwijk (NL)

(73) Assignee: INTRINSIC ID B.V., Eindhoven (NL)

( * ) Notice: Subject to any disclaimer, the term of this patent is extended or adjusted under 35 U.S.C. 154(b) by 0 days.

(21) Appl. No.: 14/426,728

(22) PCT Filed: Sep. 10, 2013

(86) PCT No.: PCT/EP2013/068746
§ 371 (c)(1),
(2) Date: Mar. 6, 2015

(87) PCT Pub. No.: WO2014/053286
PCT Pub. Date: Apr. 10, 2014

(65) Prior Publication Data
US 2015/0234751 A1      Aug. 20, 2015

(30) Foreign Application Priority Data

Oct. 4, 2012 (EP) ..................................... 12187213
Nov. 29, 2012 (EP) ..................................... 12194713

(51) Int. Cl.
H04L 9/08 (2006.01)
G06F 12/14 (2006.01)
H04L 9/32 (2006.01)

(52) U.S. Cl.
CPC ......... G06F 12/1408 (2013.01); H04L 9/0869 (2013.01); H04L 9/3278 (2013.01); *G06F 2212/1052* (2013.01); *H04L 2209/24* (2013.01)

(58) Field of Classification Search
None
See application file for complete search history.

(56) References Cited

U.S. PATENT DOCUMENTS

| 2009/0109769 A1* | 4/2009 | Isaac ....................... G06F 21/31 365/191 |
| 2009/0113217 A1* | 4/2009 | Dolgunov ............. G06F 21/556 713/190 |
| 2012/0072737 A1* | 3/2012 | Schrijen ................ H04L 9/3278 713/189 |
| 2012/0179952 A1 | 7/2012 | Tuyls et al. |

FOREIGN PATENT DOCUMENTS

| WO | 2010055171 A1 | 5/2010 |
| WO | 2011088074 A2 | 7/2011 |

OTHER PUBLICATIONS

Dec. 4, 2013 Notification of Transmittal of The International Search Report and The Written Opinion of The International Searching Authority, or The Declaration issued in International Application No. PCT/EP2013/068746.

* cited by examiner

*Primary Examiner* — David Pearson
(74) *Attorney, Agent, or Firm* — Kenealy Vaidya LLP

(57) ABSTRACT

An electronic system 100 for generating a cryptographic key, the system comprising
a memory 110 used as a physically unclonable function, the memory being writable, volatile and configured such that upon each powering-up of the memory the memory settles into a memory content which depends upon at least partially random physical characteristics of the memory, the memory being accessible through a memory interface, and
a key derivation unit 150 configured to derive the cryptographic key from the memory content into which the memory settled,
wherein the electronic system for generating a cryptographic key further comprises,
a memory read-out unit connected to the memory through the memory interface and to the key derivation unit, the memory read-out unit comprising an address scrambler 140 for retrieving the memory content over the memory interface in a scrambled order.

16 Claims, 5 Drawing Sheets

SYSTEM FOR GENERATING A CRYPTOGRAPHIC KEY FROM A MEMORY USED AS A PHYSICALLY UNCLONABLE FUNCTION

CROSS REFERENCE TO RELATED APPLICATION

This application is a national phase filing under 35 C.F.R. § 371 of and claims priority to PCT Patent Application No. PCT/EP2013/068746, filed on Sep. 10, 2013, which claims the priority benefit under 35 U.S.C. § 119 of European Patent Application Nos. 12187213.9 and 12194713.9, filed on Oct. 4, 2012 and Nov. 29, 2012, respectively, which are hereby incorporated in their entireties by reference.

FIELD OF THE INVENTION

The invention relates to an electronic system for generating a cryptographic key, the system comprising a memory used as a physically unclonable function, the memory being writable, volatile and configured such that upon each powering-up of the memory the memory settles into a memory content which depends upon at least partially random physical characteristics of the memory, the memory being accessible through a memory interface, and a key derivation unit configured to derive the cryptographic key from the memory content into which the memory settled.

BACKGROUND OF THE INVENTION

Physical unclonable functions (PUFs) have proven to be advantageous alternatives for many forms of secure identification, including the storing of keys, identifiers and the like in secure memories.

A physical unclonable function exploits manufacturing variations to derive a digital identifier. The digital identifier is thus tied to a physical medium. Because the physical unclonable function depends on random process variations, it is easy to create a PUF but it is very hard, if not downright impossible, to create a PUF which would give rise to a particular pre-determined identifier. The manufacturing variations lead to different physical characteristics of the memory element. For example, the physical characteristics may include: doping concentrations, oxide thickness, channel lengths, structural width (e.g. of a metal layer), parasitics (e.g. resistance, capacitance) and the like. When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

A convenient choice for PUFs are volatile memories, in particular flip-flop based memories, more in particular, static random access memories (SRAM). Such memories are easy to evaluate and low in manufacture costs. A PUF based on SRAM are called SRAM PUFs. SRAMs have the property that after they are powered-up, they are filled with a random pattern of on-bits and off-bits. Although the pattern may not repeat itself exactly if the SRAM is powered-up a next time, the differences between two such patterns is typically much smaller than half the number of bits in the state. The difference between memory power-up contents of the same SRAM is generally much smaller than the difference between memory power-up contents of different SRAMs.

Since the PUF may not give the exact same result when the same challenge is evaluated twice, a so-called Helper Data algorithm, also known as a Fuzzy Extractor, may be used to ensure that the key will be the same, each time it is derived. One way of using helper data to construct reproducible values from noisy measurements is described, e.g., in international patent application WO 2006/29242, "Template Renewal in Helper Data Systems", etc.

One application of PUFs, in particular SRAM PUFs is to derive a cryptographic key on an electronic circuit. The electronic circuit typically includes an integrated Circuit (IC) and/or programmable logic.

One advantage of PUFs is that they inherently possess tamper resistant qualities. Without a PUF, the cryptographic key may be recovered by an attacker, by mounting a physical attack on the non-volatile memory where the key is traditionally stored. For example, the attacker may open the memory and probe its content. Using a PUF makes this type of attack much harder, since opening the PUF will typically disturb it; probing say an SRAM for its dynamic contents is much harder than probing embedded Non-Volatile Memory. Accordingly, information the attacker learns from his probe is not related to the interaction which was used to create the cryptographic key. This makes it harder for an attacker to find the key using a physical attack.

Unfortunately, intrusive physical attacks are not the only attack vector along which an attacker may obtain at least some information on the internal state of the PUF. So-called side channels may also leak information. A side-channel is an information source on a system related to physical phenomena occurring inside the system that may be observed from outside the system and that reveals information which, at least to some extent, is correlated with the internal operation and/or state of the system, other than its intended, observable, input-output behavior.

Power consumption, time consumption and electromagnetic radiation are examples of side-channels that are relevant to cryptographic systems. For example, the power consumption of a cryptographic system monitored while the system uses a cryptographic key may to some extend be correlated to the key. As it is of prime importance to keep the cryptographic key confidential, any leakage of information correlated with that key is problematic.

In international patent application PCT/EP2010/051631, published as WO/2010/100015, with title "System for establishing a cryptographic key depending on a physical system" discloses solutions to reduce side-channel leakage occurring during the error correction part of the key derivation from a PUF, i.e., during execution of the Helper Data algorithm. The error correction is a particularly important phase to avoid side channel leakage, since it handles the sensitive data multiple times, introducing multiple non-linear correlations. Furthermore, if the error correction is implemented in software the leakage is magnified.

SUMMARY OF THE INVENTION

It has turned out that, once the side channel leakage which may occur during error correction has been addressed, smaller sources of side channel leakage remain. Although these smaller sources require a more sophisticated measurement and, even after successful measurement, provide only relatively little sensitive information, there is nevertheless a desire to address other sources of side channel leakage that may occur during derivation of secret keys.

When power consumption of a memory based PUF, such as an SRAM PUF, is measured, one side channel occurs during the readout process of the memory. For example while a PUF control block reads out the startup values (power-up memory content) of a memory that is connected through a memory interface. The power consumption of the memory interface depends on the hamming weight of the data word that is transferred. Reading out the SRAM memory contents may leak out hamming weight information of the data bytes that are read through power or electro-magnetic analysis or even photo-emission attacks.

If one assumed a perfect correspondence between hamming weight and power consumption, the data leakage for an 8 bit wide memory interface would theoretically be as high as about 2.54 bits per byte, i.e., about 30%. Although in practice, the correspondence is much less than perfect, and accordingly the information leakage is much smaller, there is a need to reduce the side channel leakage in the memory interface of memory based PUFs. The theoretically maximal leakage per bit drops sharply as the memory interface becomes wider. For example, the theoretical leakage per bit is almost halved if the memory interface is increased to 16 bit. However, larger memory interfaces are more costly and draw more power, preventing their use in some circumstances.

Photo-emission attacks make use of the optical side channel formed by the few photons that may be emitted when a state changes in integrated circuits.

An electronic system for generating a cryptographic key is provided. The system comprising a memory used as a physically unclonable function, the memory being writable, volatile and configured such that upon each powering-up of the memory the memory settles into a memory content which depends upon at least partially random physical characteristics of the memory, the memory being accessible through a memory interface, and a key derivation unit configured to derive the cryptographic key from the memory content into which the memory settled.

The electronic system for generating a cryptographic key further comprises, a memory read-out unit connected to the memory through the memory interface and to the key derivation unit, the memory read-out unit comprising an address scrambler for retrieving the memory content over the memory interface in a scrambled order.

Because the memory content is transferred over the memory interface in a scrambled order the side channel leakage has been reduced. Although the hamming weight of a data word itself is still leaked, the correspondence between hamming weight and a particular data word of the memory content it lost. The reduction in side channel leakage is large if the size of the memory content is large compared to the size of the individual data words that make up the memory content. This is because in that case there are many potential data words to which a measured a hamming weight could belong. This is particularly convenient since the potential leakage is larger for small data words (8 bits and less). It is estimated that, side channel leakage for a 1024 bit memory content or more, is negligible.

Note, that many potential countermeasures which attempt to reduce the amount of information leaked from hamming weight dependent power differences are inapplicable. For example, so called constant-weight codes have been proposed as a countermeasure. In a constant-weight code all sensitive data is encoded in data words which have a fixed hamming weight, usually equal to half the data word bit-size. Although this countermeasure reduces hamming weight dependent power differences, in say key storage in secure memories, it is not applicable to memory based PUFs. The physical characteristics which determine the memory content are random, i.e., one cannot prescribe a particular type of encoding for the memory content.

The electronic system for generating a cryptographic key may be comprised in a mobile computing device, such as smart card, a mobile communication device, such as a mobile phone, a tablet etc. The key derived from the memory content may be used in a challenge response protocol in which the system proves it has possession of the key. The key may be used for confidentiality protections, e.g., in an encrypted storage or communication. The derived key may be a symmetric key, but may even be an asymmetric public/private key pair, for example, by using the key as a seed for finding an asymmetric key.

The electronic system for generating a cryptographic key may be comprised in an integrated circuit. For example, the integrated circuit may be an ASSP, i.e., a special integrated circuit that implements a specific function applicable to a wide market. ASSP are used for example to implement audio/video codec. The security of an ASSP supporting cryptographic functions using a cryptographic key is improved by generating the cryptographic key with the electronic system for generating a cryptographic key as described herein.

For example, the integrated circuit may be a DSP. This will improve applications that use, e.g., encryption with the PUF-generated key or derivatives of it; for instance to protect streaming content while keeping the key safe.

The PUF-generated key may be used as a root of trust for authentication and/or for establishing a secure communication channel. The latter may, for instance, be important for an NFC chip comprising the electronic system for generating a cryptographic key.

The memory is used as a physically unclonable function. The memory may comprise multiple binary storage elements which may be configured into two stable states. At start-up each binary storage element settles in one of the two stable states. Which state it settles in is mostly determined by the precise manufacture, e.g., doping levels, of the storage element, although the state in which the element settles is also influenced by chance fluctuations. For example the memory may comprise multiple flip-flops, in particular D-type flip-flops, in particular the memory may be SRAM memory. The power-up content of the memory is subject to noise and perturbations. Some FPGA's comprise un-initialized SRAM blocks that may be used as memory used as a physically unclonable function.

The memory interface may comprise an address channel and a data channel. Scrambled access to the memory may be accomplished by scrambling, e.g., encrypting memory addresses before they are put on the address channel. In that case a different scrambling order may be obtained by selecting a different key. Preferably, the scrambling order is unknown to the attacker, i.e., secret, more preferably the scrambling order is unique for the device, e.g., chosen at manufacture time, more preferably, the scrambling order is frequently changed by the system itself, even more preferably, the scrambling order is determined at least partially random at start-up of the memory read-out unit.

Power Analysis, Electro-magnetic Analysis and photo emission attacks typically require many repeated measurements (traces) in order to get a good signal-to noise ratio. A statistical analysis is then performed over the repeated measurements. By randomizing the read-out order, or even regularly changing the read-out order, this analysis is thwarted.

The key derivation unit is configured to derive the cryptographic key from the memory content into which the memory settled. The derivation unit removes the noise from the memory content. For example, it comprises a non-volatile helper-data memory, the helper-data memory storing helper data constructed for the memory used as a physically unclonable function, a combiner for establishing a correct-able bit-string, the correctable bit-string lying in a correct-able neighborhood of an error correcting code, the combiner being configured to retrieve the helper data from the helper-data memory and to combine the retrieved helper data with the memory content into which the memory settled, and an error-corrector configured to establish a code word of an error correcting code from the correctable bit-string using an error correcting algorithm.

The helper data was constructed for one particular physical instantiation of a memory, since memory start-up contents of different memory chips are too different. If the memory content is obtained in a scrambled order, the helper data may be applied in the same scrambled order or the scrambled memory content is descrambled. Hybrid solutions are possible, for example, scrambling may be removed, i.e., by performing a permutation which is the inverse of the scrambling order, while at the same time a fixed pre-determined order is applied. The pre-determined order may be secret for an attacker. For example, the system may have been configured with the pre-determined order during manufacture. The pre-determined order may be different for each device.

The memory read-out unit is configured for securely reading out a memory. An address scrambler may be used for retrieving the memory content over the memory interface in a scrambled order. Memory encryption is not directly suitable to protect a PUF since its content cannot be pre-scribed. We refer to scrambling to indicate obfuscation of data by changing its order, i.e., permuting it, which is different from obfuscation of data by changing the data itself, i.e., through encryption.

For the reconstruction of a cryptographic key from a PUF, the PUF data must be combined with the helper-data in a particular, pre-determined, order. In the design of the PUF control block it is more efficient if the helper-data can be read out in a linear order. In particular, if the helper data is a memory that does not provide a random-access external address bus but in which data must be read on a block-wise basis, with typical block sizes of hundreds to thousands of bits. For example, if the helper data memory is flash memory, it is inefficient to read out the helper data in a different order. It would be advantageous if the helper data can be read out linearly. In an embodiment, the helper data is read block by block, each block being read linearly. At the same time it would also be advantageous to avoid descrambling the memory content after it was received over the memory interface.

This may be accomplished, by having an encryption and decryption unit in the memory read-out unit. The encryption unit is configured to encrypt the memory, the encryption unit being configured to receive from the memory interface the memory content into which the memory settled in the scrambled order, encrypt the received memory content and write back the encrypted memory content to the memory. The decryption unit is configured to decrypt the memory, configured to receive from the memory interface the encrypted memory content in a pre-determined order, decrypt the received encrypted memory content to obtain the memory content into which the memory settled in the pre-determined order.

This provides a secure read-out of data which cannot be encoded beforehand, such as memory power-up data, in two phases. In the first phases, security is accomplished through scrambling (permutation); in the second phase security is accomplished through encryption. The first phase does not give random access, but in the second phase the memory may be accessed in any desired order, in particular in the order needed to combine with the helper data. The latter may be linear, but may also be some other pre-determined order for additional obfuscation. In the latter case the helper data was prepared for the SRAM data in the same pre-determined order. From the perspective of the helper data is does not matter in which order the SRAM data is read out, as long as the order was same when the helper data was prepared.

The encryption may encrypt each block of data with a temporary key. The temporary key may be derived internally to the system. For example, the temporary key may be derived from a second PUF, possibly internal to the PUF control block, which second PUF provides the randomness for the out of order readout and/or encryption. In an embodiment, encrypted data blocks are immediately written back into the SRAM memory. In an embodiment, the encryption unit writes the encrypted content data back in the scrambled order thereby overwriting the memory content with the encrypted memory content.

The scrambled read-out and encrypted write back is a preparation step that is done before the helper-data is processed. When the cryptographic key needs to be constructed, all the SRAM PUF data is read out in order and is decrypted before being XORed with the helper-data.

The electronic memory read-out unit for securely reading out a writable memory in a pre-determined order is particularly advantageous. The inventors have realized that the read-out unit may be used for secure read-out of other writable memories as well. Any memory which needs secure, side-channel protected, read-out, which for some reason cannot be encoded or encrypted beforehand, say encrypted or encoded with a hamming weight balancing code, may thus be securely read. The memory is preferably writable, since that allows the two-pass method. The memory may be volatile, e.g. for use as a PUF, or non-volatile, say for data transfer.

In an embodiment, the read-out unit comprises a further volatile memory, different from the memory used as a PUF, configured such that upon each powering-up of the further memory the second memory settles into a noisy memory content, the seed being derived from the memory content into which the second memory settled.

It may be necessary to repeat the read-out of the memory. For example, in some embodiments, the memory used as a PUF may be powered-up again, independent from the power of the PUF control block, or more in particular, the memory read-out unit. For example, this may be done to derive the cryptographic key again; this allows the key to be deleted as soon as it has been used. However, if the randomness is obtained from PUF dependent upon powering up to create new values, e.g., memory based PUF, the PUF would not give a new scrambling order. This may be avoided by a read-out unit that comprises a cryptographic one-way function configured to be applied to the seed to obtain a new seed, the address scrambler being configured to derive a new scrambled order from the new seed for a re-fetching the memory content over the memory interface in the new scrambled order, without requiring a power-up. For example, the memory read-out unit may be configured to receive a signal that the memory used as PUF is powered-up again. Upon receiving, the signal, the one-way function is applied, and a new seed and/or encryption key is derived.

The further PUF, or second PUF, is preferably inside the PUF control block and/or memory read-out unit, it may thus be a separate SRAM PUF. The second PUF may be used to generate a random seed that can be used to create a random permutation of the memory addresses that need to be read out in order to measure the SRAM PUF. A conditioning algorithm, e.g. a hash function, may be used to compute a random seed from a PUF response.

Preferably the second PUF also consists of a standard component that can easily be integrated in the IP block. A DFF PUF is a good choice for this situation. The startup values of D flip flops are sufficiently random. The one way function may be a crypto block, such as AES, DES, SHA, and the like.

An aspect of the invention is a method for generating a cryptographic key. The method comprises powering-up of a memory used as a physically unclonable function, the memory being writable and volatile, allowing the memory to settle into a memory content which depends upon at least partially random physical characteristics of the memory, retrieve the memory content over a memory interface in a scrambled order, deriving a cryptographic key from the memory content into which the memory settled.

An embodiment of the method comprises encrypting the memory by receiving from the memory interface the memory content into which the memory settled in the scrambled order, encrypting the received memory content, and writing back the encrypted memory content to the memory, and decrypting the memory by, receiving from the memory interface the encrypted memory content in a pre-determined order, and decrypting the received encrypted memory content to obtain the memory content into which the memory settled in the pre-determined order.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings.

Figure 1A:
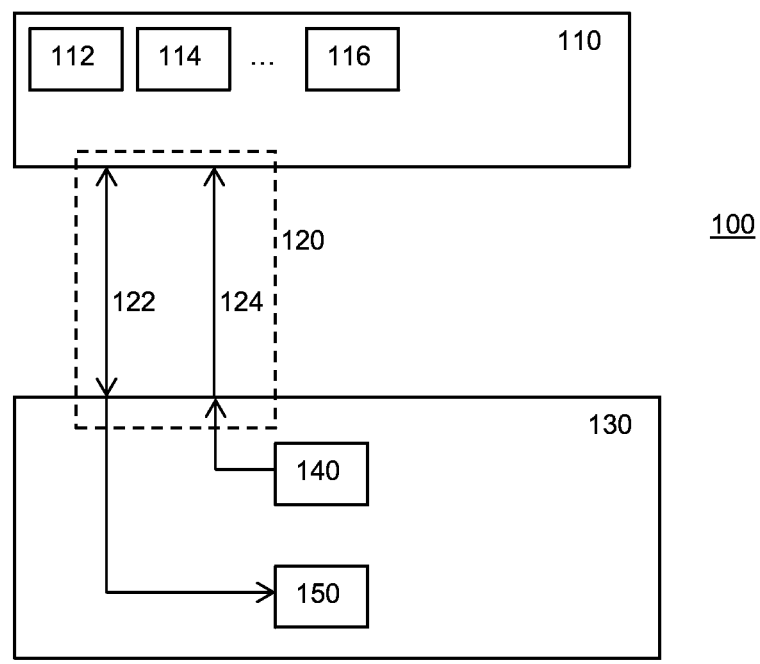
FIG. 1a is a block diagram illustrating an electronic system for generating a cryptographic key.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS IN BLOCK DIAGRAMS 100 an electronic system for generating a cryptographic key
110 a memory used as a physically unclonable function
112, 114, 116 memory locations
120 a memory interface
122 a data channel
124 an address channel
130 a PUF control block
140 an address scrambler
150 a key derivation unit
152 a buffer
154 a permutator
156 error correction logic
200 an electronic system for generating a cryptographic key
210 a PUF control block
220 a memory read-out unit
230 a key derivation unit
240 an encryption unit
250 a decryption unit
255 address generator
260 a further memory
265 a random key and seed derivation unit
270 a buffer
280 a combiner
285 a helper data memory
290 an error corrector
295 a key derivation function unit
310 memory content
312,314,316 code-word sized memory chunks
320 scrambled memory access
322,324,326 code-word sized memory chunks
330 scrambled memory access
510, 511, 512, 514 an encryption phase
520 a decryption phase

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1B:
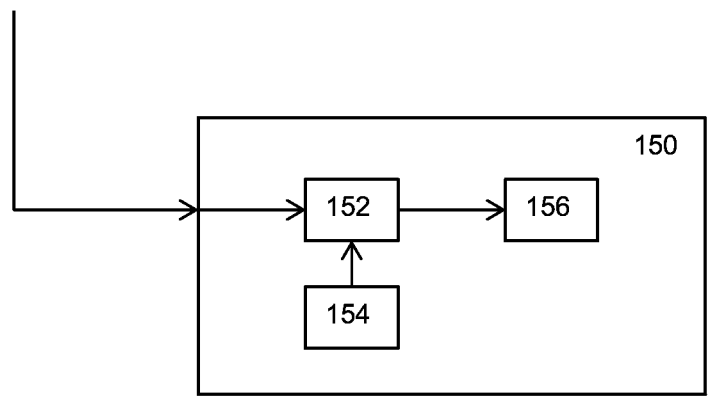
FIG. 1b is a block diagram illustrating a key derivation unit for use in system of FIG. 1a, FIG. 2 is a block diagram illustrating an electronic system for generating a cryptographic key.

FIGS. 1a and 1b illustrate as a schematic block diagram an electronic system 100 for generating a cryptographic key.

System 100 comprises a memory 110 used as a physically unclonable function (PUF). The memory is of a writable and volatile kind. Furthermore, the memory has the property that upon each powering-up of the memory the memory settles into a memory content which depends upon at least partially random physical characteristics of the memory. The physical environmental fluctuations are typically caused by small process variations during manufacture.

Since the memory content into which the memory settles depends upon such physical characteristics, the memory content identifies the particular instantiation of the memory. That is, two memories 110 of the same design would show a memory content upon start-up which is sufficiently different to identify the memory. For example, memory 110 may be based upon flip-flops; in particular, memory 110 may be an SRAM.

Memory 110 comprises a sequence of memory locations of which the power-up content is used as a PUF. The memory locations are accessible, that is read or write accessible, through a corresponding sequence of memory addresses. Of the sequence of memory locations three are shown 112, 114 and 116.

System 100 comprises a PUF control block 130. PUF control block 130 is configured to process the memory content into which memory 110 settles at start-up to produce a cryptographic key. In its raw state the memory content is not directly usable as a key. The memory content of memory 110 upon power-up depends not only on its physical characteristics; the memory content is also influenced by noise. Furthermore, there is an influence of physical fluctuations in its environment, such as temperature, and mechanical stress on the memory. Since the memory content is subject to noise it is not directly useable as a cryptographic key. Also the entropy in a single bit may be too low. PUF control block 130 addresses these by error correcting and optionally key derivation. Error correction and the like are performed by key derivation function 150, which is comprised in control block 130.

The PUF control block 130 is connected to memory 110 through a memory interface 120. Memory interface 120 comprises a data channel 122, e.g. data lines, and an address channel 124, e.g., address lines. Memory interface 120 may also comprise control lines and the like.

The use of memory interfaces has the drawback that it is a potential side-channel. The hamming weight of a word that is communicated over data channel 122 may be determined by observing the power consumption of system 100, while the word is transferred over data channel 122. For example, if data channel 122 is 8 bit wide, each word could leaks on the order of 1-2 bits of information. Such leakage comprises the security of the entire system.

Control block 130 comprises an address scrambler 140 for retrieving the memory content over the memory interface in a scrambled order. Preferably, address scrambler 140 implements a (pseudo)random permutation. For example, address scrambler 140 generates the sequence of memory addresses in the scrambled order. A convenient way to implement address scrambler 140 is by encrypting the sequence of memory addresses by a suitable sized encryption function. Conveniently, the size of memory 110 is chosen to be a power of 2, so that it may be one-to-one addressed by an integer number of bits. In that case, a block cipher may be used having a block width equal to the integer number of bits. Such block ciphers may be constructed using a Feistel cipher. The Feistel cipher may be unbalanced, for example, a so called Thorp shuffle may be used. More in general a memory 110 having any addressing scheme or any size may be accommodated using so-called format-preserving encryption. Format-preserving encryption bijectively maps the sequence of addresses onto itself.

When encryption is used, address scrambler 140 may generate the sequence of addresses in any order, say linearly, and encrypt the sequence. Alternative ways to produce the sequence of addresses in a scrambled order may be used. For example, address scrambler 140 may comprise a feedback shift register, e.g., a linear feedback shift register configured to produce the sequence of memory addresses in a scrambled order.

The memory content in which memory 110 settled is retrieved in the scrambled order.

In the embodiment of FIG. 1a, 1b, the key derivation unit 150 receives the memory content in the scrambled order. FIG. 1b shows one particular way to process the memory content.

Key derivation function 150 comprises a buffer 152, a permutator 154 and error correction logic 156.

Buffer 152 buffers the memory content received from memory 110, e.g., from a memory read-out unit (not separately shown in FIG. 1a). Permutator 154 performs the inverse permutation applied by address scramble 140. Permutator 154 may produce in buffer 152 the memory content in the same order as it was produced in memory 110. But, permutator 154 may produce in buffer 152 the memory content in any pre-determined order, by performing a function composition of the inverse of the scrambling permutation with a permutation representing the pre-determined order. Permutator 154 may be connected, or even integrated with, scrambler 140, to obtain the correct descrambling operation. The result of the inverse permutation is passed on to error correction logic 156. Error correction logic 156 corrects the noise by combining with helper data, and optionally, applies a key derivation function (KDF) to the result, e.g., the result could be hashed with a cryptographic hash function. Correction of noise in the memory content of a memory used as a PUF is known per se. One may include buffer 152 and permutator 154 with the memory read-out unit instead of with the key derivation function.

As memory content only travels over the memory interface in scrambled form, it still reveals a hamming weight, however considerably less information is leaked since it is no longer known to which word the hamming weight corresponds.

Although this a significant advantage, there are some drawbacks to the embodiment of FIGS. 1a, 1b. First of all it requires a descrambling operation, performed by permutator 154. This is a relatively costly operation especially if it is to be done in place.

Figure 3A:
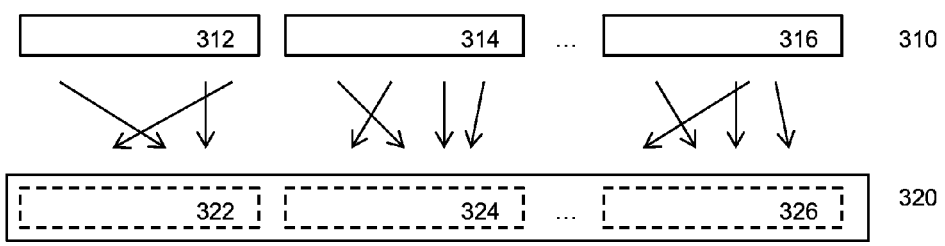
FIG. 3a is a block diagram illustrating code word boundary preserving scrambling

If the error correction logic 156 uses a single code word, then buffer 152 would be twice the size of memory 110 in order to use not-in place descrambling. This is relatively costly. However, preferably, the error correction uses multiple code words since smaller code word correction is more resource efficient. In that case the scrambling operation may be configured to respect code word boundaries, but there are other options, e.g. use a larger buffer or use other solution described herein. FIG. 3a illustrates a scrambling operation.

Memory content 310 is partitioned into code-word sized memory chunks. FIG. 3a shows three such chunks 312, 314, 316. Each of the chunks may be error corrected independently of the other chunks. At 320 the same part of memory is depicted but with scrambled memory access. The arrows indicate the scrambled address corresponding to an original address. Note that this mapping respects code word boundaries. That is, the sequence of memory addresses comprises multiple code sequences of sequential memory addresses, address scrambler 140 generates a sequence of address such that each one multiple code sequences are generated together without being interleaved by addresses of a different sequence. Although such an address scrambling prevents less side channel leakage, it is still a marked improvement. FIG. 3b shows a scrambled memory access 330 which does not respect code word boundaries. Such a scrambling function prevents more leakage, but is harder (though not impossible) to accommodate by the key derivation function of FIG. 1. The system described below with respect to FIG. 2 is able to handle the scrambled memory access, such as scrambled memory access 330, which does not necessarily respect code word boundaries using a two pass system.

Instead of using permutator 154 it is also possible to take the scrambling into account during combination with helper data. In that case key derivation unit 150 may comprise a combiner that reads from buffer 152, and from a helper data-memory (neither shown in FIG. 1b). This approach also has disadvantages: helper-data memory is usually a non-volatile memory, which is usually read out in blocks, so that random access in helper-data memory often carries a high performance penalty.

Figure 2:
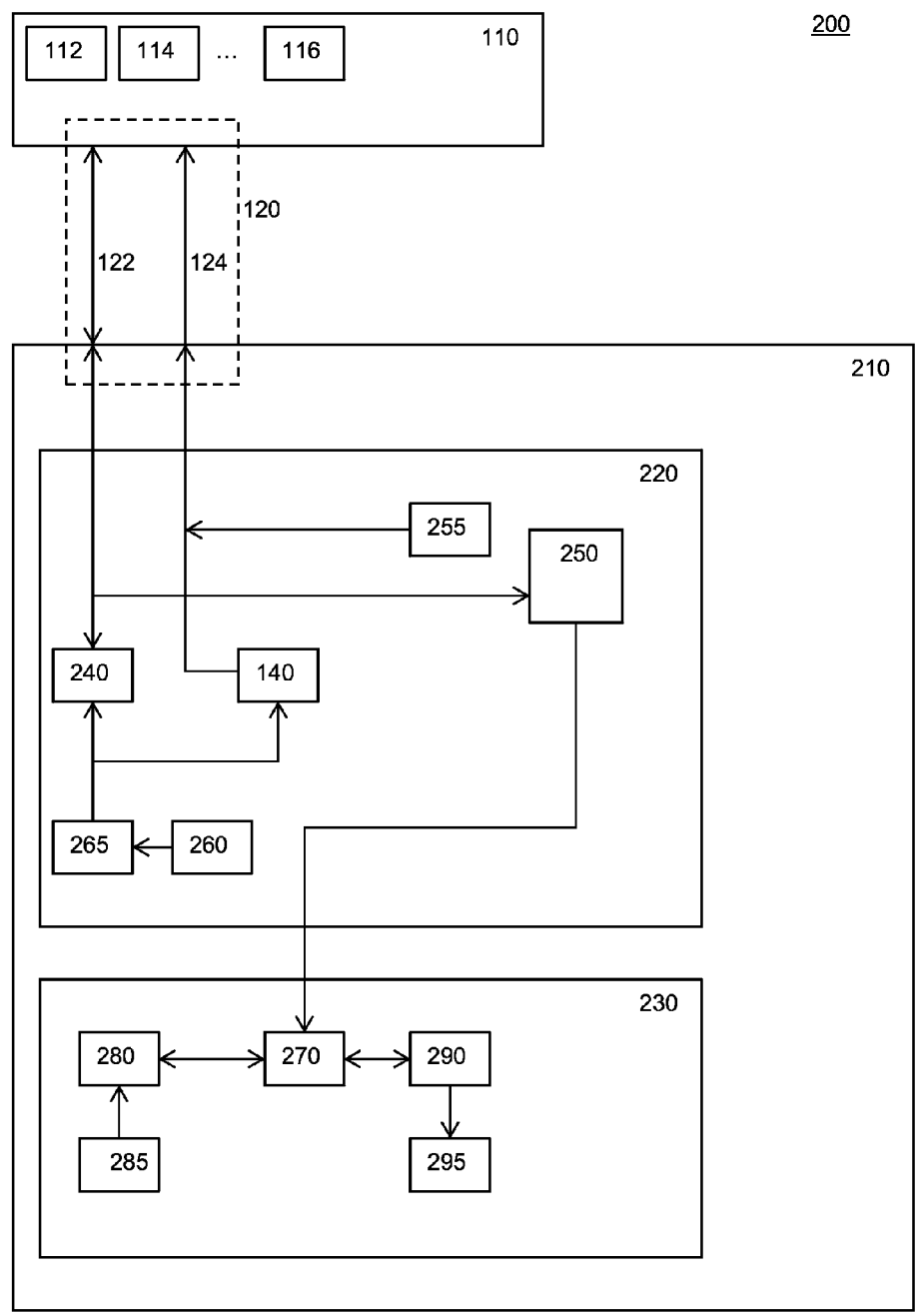
Figure 3B:
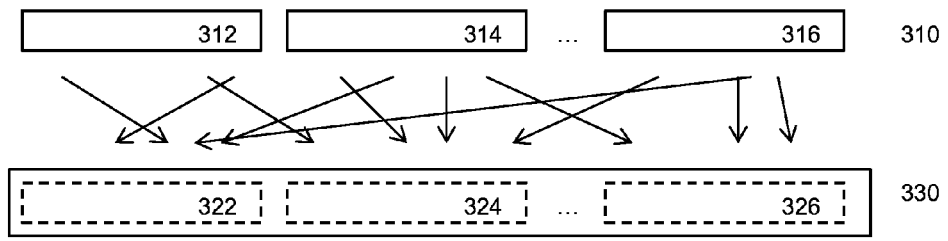
FIG. 3b is a block diagram illustrating non-code word boundary preserving scrambling.
Figure 4:
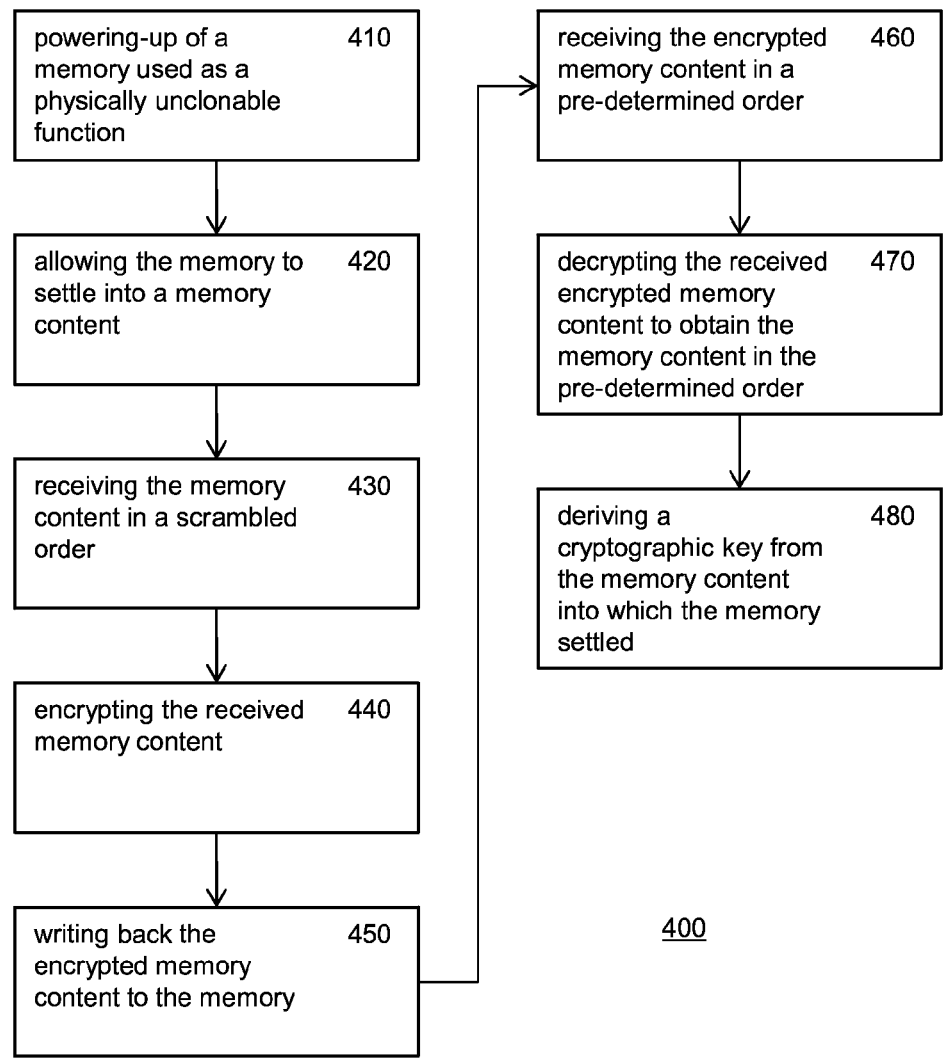
FIG. 4 is a flow chart illustrating a method for generating a cryptographic key.

FIG. 2 illustrates an improved electronic system 200 for generating a cryptographic key. FIG. 4 illustrates in a flow chart a method for generating a cryptographic key that may be performed using system 200, although variations are possible.

Like system 100, system 200 comprises a memory 110 used as a PUF connected through a memory interface 120 to a PUF control block 210. PUF control block comprises a memory read-out unit 220 and key derivation unit 230.

Memory read-out unit 220 is configured to securely read out memory 110 in a pre-determined order. The pre-determined order is determined by what is convenient for the subsequent key derivation. Typically, the pre-determined order is the natural linear order, but any order is possible. For example, for increased obfuscation, a random but fixed pre-determined order may be selected, and helper data may be computed for the memory content permuted according to that random but fixed pre-determined order. From here on we will assume the pre-determined order is linear, but it is noted that this may be varied. The memory content is obtained by powering-up of memory 110 (step 410) and allowing the memory to settle into a memory content (step 420). The settling time depends on the memory, and may be determined experimentally if needed. Since settling time is typically much shorter than the booting functions that are typically performed on electronic computing devices, it is usually not needed to introduce a delay element which delays read-out of the memory for software implementations of the memory read out unit.

Key derivation unit 230 receives the memory content into which memory 110 settled in the pre-determined order from memory read-out unit 220. In an embodiment one may use a known key derivation unit configured to perform usual PUF processing (error correction and typically a key derivation function). If a known key derivation unit is used, then from the perspective of key derivation unit 230 it receives memory content data as usual. This part of the system will thus only be given a cursory description.

Key derivation unit may comprise a buffer 270. Buffer 270 is large enough to hold a single code word. Key derivation function may comprise a combiner 280 for combining the content of the buffer with helper data stored in a helper data memory 285. We will assume that the combining function is the typical bit-wise XOR operation, although any invertible binary operation may be used, e.g., addition modulo the number of different word values, e.g., modulo 256 for a byte. The helper data may have been obtained by XOR-ing a previously obtained copy of the memory content with a code word of an error correcting code. The code word is secret, and may have been chosen at random from the error correcting code or selected according to some key management scheme. During operation combiner 280 XORs the helper data with the memory content obtained in buffer 270 to obtain a correctable bit string that lies in a neighborhood of the secret code word. An error corrector 290 applies an error correcting code algorithm corresponding to the error correcting code to obtain the secret code word again. If needed, a key derivation function unit applies a key derivation function (KDF), for example, a cryptographic hash function. The cryptographic function may be used for any cryptographic purpose, e.g., authentication, encryption, etc.

Interestingly, the error correction may use a two-pass system for error correction as well. The memory may be portioned into smaller words, which are individually corrected to code words, e.g., from a Hadamard code. The corrected smaller code words are combined into larger words which are to be corrected with a larger block size error correcting code, say a BCH code. The combining into larger words preferably interleaves the smaller code words. The key derivation function may write the corrected smaller code words back to the memory, in encrypted form. The key derivation function may perform random access on the memory, using the decryption unit, e.g., to perform the interleaving. In this way memory 110 may be used as working memory for more complicated error correction schemes, while still reducing side-channel leakage; after memory 110 has been encrypted it supports random access read/write access through the encryption and decryption unit.

Key derivation unit may use countermeasures to reduce its side channel leakage if needed. For example, the device and method described in WO/2010/100015 may be used.

The memory read-out unit comprises an address scrambler 140 to retrieve the memory content over the memory interface in a scrambled order, and an encryption unit 240. Encryption unit 240 receives the data retrieved by scrambler 140 and encrypts it. The encrypted data, i.e., the encrypted memory content is written to a memory. Although any memory could be used, preferably the encrypted memory content is written back to memory 110. To reduce the amount of needed memory, the memory content may be written back in the same scrambled order, thereby overwriting the memory content with the encrypted memory content; each encrypted memory word is written back to the same scrambled address from which it was read. Together encryption unit 240 and scrambling unit 140 may have the effect of encrypting the memory in place, but in a scrambled order.

Encryption unit 240 may be a block cipher. For example, encryption unit 240 may operate in electronic code book mode (ECB). For example, encryption unit 240 may operate in counter mode (CTR), e.g., encrypting the address in ECB mode and XOR-ing the result to the memory content. Since the block size is often quite small, say, 8, 16, or 32 bits, the latter is preferred since it obscures the relation between words in the memory content which happen to have equal values.

The encryption unit needs a key. The address scrambler needs either a seed, or in case address encryption is used also a key. The key may be fixed, but more preferably it is produced at start-up of memory read-out unit 220. The key/seed may be produced randomly, either true or pseudo random. For example, memory read-out unit 220 may comprise a true random number generator (not shown).

However, it is observed that randomness is typically only needed during power-up of memory read-out unit 220. This allows another solution which is shown in FIG. 2. Memory read-out unit 220 comprises a further memory 260 (preferably internal to the PUF control block 210 and different from memory 110). Also further memory 260 is volatile. Upon each powering-up of the further memory the second memory settles into a noisy memory content. Note that the content of the further memory will also depend on its physical characteristics, but for this purpose the noise in the memory content is exploited. Random key and seed derivation unit 265 derives a key and/or seed from the memory content of memory 265, for example, by applying a hash function to the content of memory 260. Should a new key/seed be needed, for example to re-read the contents of memory 110 later, without a new powering-up then a new key and new seed may be obtained by applying a one-way function to the old seed.

Memory read-out unit 220 further comprises a decryption unit 250 and an address generator 255. Address generator 255 may be combined with decryption unit 250. Address generator 255 is configured to produce the sequence of memory address in the pre-determined order. Decryption unit 250 then decrypts the received encrypted memory content.

Thus a secure read-out is obtained in two passes. In a first pass the memory in encrypted. This pass suffers less from side-channel leakage, since access to the memory is in a scrambled order. In the second pass the memory is read-out in any desired order, such as a pre-determined order. The second pass more secure since all data that passes over the memory interface is encrypted. An advantage of system 200 over system 100 is that any scrambling function may be used even without respecting code word boundaries, while key derivation may still work on smaller sized code words.

System 100 and 200 may be implemented as an electronic device, for example, a semiconductor device. System 100 and 200 may be implemented in dedicated hardware. Part of system 100 and 200 may be implemented as software. In the latter case, typically, the system, say the PUF control block, comprises a microprocessor (not shown) which executes appropriate software stored at the device, e.g. the software may have been downloaded and stored in a corresponding memory, e.g. RAM (not shown) or a non-volatile memory such as Flash.

FIG. 4 illustrates in a flow chart a method for generating a cryptographic key. The method of FIG. 4 may be performed using system 200, although variations are possible. Note that the steps 440, 450, 460 and 470 of FIG. 4 are optional for the method, and may be omitted, e.g., using system 100.

Operation of system 200 may be done as follows. First the system is powered-up. (Step 410) During the powering up, memory 110 is powered-up and allowed to settle in its memory content (step 420). The memory content of memory 110 is representative for this particular memory although it may be noisy. The read-out of this memory content is done in two passes: In the first pass, the memory content is retrieved (step 430) in a scrambled order, say by scrambler 140, step 430 and received for encryption, say by encryption unit 240. The memory content is encrypted (step 440) and written back (step 450). In a second pass, the encrypted memory content is retrieved, say by an address generator 255 in a pre-determined order, say the linear sequential order, and received by a decryption unit 250 (step 460). The encrypted memory content is decrypted to obtain the memory content in which memory 110 settled in the pre-determined order (step 470).

At this point the memory content has securely passed from memory 110 over memory interface 120 with no or minimal side channel leakage. PUF processing may proceed, by combining the memory content with helper data to obtain one or more correctable bit-strings. A correctable bit-string lies in a correctable neighborhood of an error correcting code. The one or more correctable bit-strings may be error-corrected to establish a code word of an error correcting code using an error correcting algorithm. A key may be derived from the established code word by applying a KDF.

In steps 460 and 470 the memory content is obtained in a pre-determined order. This is desirable if the memory content is to be combined with data, such as helper data, which requires a particular order. However, steps 430, 440, 450, 460, and 470 may be used together, e.g., without steps 410, 420 and/or 480, to read any data securely from a writable memory, not just PUF data. In that case it is not necessary for the memory content to be received in a pre-determined order in steps 460 and 470 instead any desired further order is possible. For example, A method for securely reading out a memory in a further order comprises for generating a cryptographic key as in Claim 11, comprising encrypting the memory by receiving (430) from the memory interface the memory content in the scrambled order, encrypting (440) the received memory content, and writing back (450) the encrypted memory content to the memory, and decrypting the memory by, receiving (460) from the memory interface the encrypted memory content in the further order, and decrypting (470) the received encrypted memory content to obtain the memory content in the further order.

Many different ways of executing method 400 are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 470 and 480 may be executed, at least partially, in parallel. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

FIG. 5a-5d illustrates different possibilities for scrambling and encrypting the memory. For simplicity only 8 memory location of the memory are shown, the memory content extends at least over these 8 memory locations. In practice a much larger memory may be used. In the figures, memory locations are indicated with a number of 1 to 8. A memory location may be, e.g., a word, such as an 8 bit word, or a 16 bit word, etc; read access to a memory access is indicated with an 'R', and write access by a 'W'; an obfuscating access is indicated with an 'A'. The obfuscating access may be a read, a write, or a combination of a read and write to the same memory location; Time increases from left to right.

Figure 5A:
FIG. 5a is an exemplary illustration of a possibility for an encryption phase and decryption phase.

In FIG. 5a, two phases are shown an encryption phase 510 and subsequent decryption phase 520. During the encryption phase the memory read-out unit iteratively: reads from a memory location, i.e., from a memory address, encrypts the content read from the memory address, and writes back to the same memory address. The memory addresses are scrambled by the address scrambler. At the end of the encryption phase 510 the entire memory content has been encrypted, even though the memory has been read in a scrambled order. The particular scrambled order shown in FIG. 5a is exemplary.

Figure 5B:
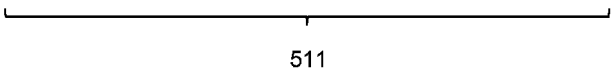
FIG. 5b is another exemplary illustration of a possibility for an encryption phase.
Figure 5C:
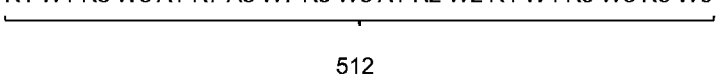
FIG. 5c is yet another exemplary illustration of a possibility for an encryption phase.
Figure 5D:
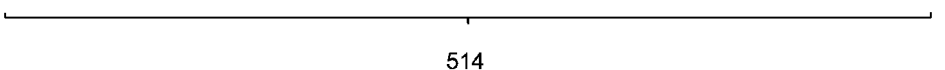
FIG. 5d is yet another exemplary illustration of a possibility for an encryption phase.

During the decryption phase the decryption unit received the encrypted memory content in a further order. The further order used in the FIG. 5a is the natural sequential order. Typically, the scrambled order is different when subsequent power-ups of the same device are compared but the further order is the same. To have best performance during key derivation or error correction etc, it is preferred to start the decryption phase 520 after the encryption phase ended. This is not strictly necessary, for example, after an encrypted write back to the first memory location of the further order has taken place, the decryption phase may commence with reading that location, after the next memory location of the further order has taken place, the decryption phase can continue to one further decryption. This increase in complexity will only be worthwhile when obfuscation needs to be maximal even at the expense of additional complexity. In FIGS. 5b-5d we will assume that this is not done, the decryption phases are thus the same as in FIG. 5a and not shown separately.

The embodiment of FIG. 5a in which the encryption phases comprises repeated cycles of read and encrypted write back to a sequence of scrambled memory addresses may be varied in multiple different ways. Such variations help in preventing advanced attacks.

The read and write accesses during encryption phase need not be strictly alternating. For example, the encryption phase may read multiple memory contents, encrypt them and write back multiple encrypted memory content. The order in which the write back occurs may be the same or may not be the same as the order in which they were read. The encrypted order may be linear or re-scrambled. FIG. 5b shows an encryption phase 511, wherein the read and write operations are done in multiple batches of, in this case, each 4 read and 4 writes. The batch uses linear write back, the second batch uses scrambled write back. Batches improve over the 5a case by making it harder to correlate the read value and its encryption, per address.

Recently photo-emission attacks have been demonstrated that target SRAM directly by recording photon activity from the back side of the SRAM structure during access. Photon emission attacks are based on the fact that electronic devices tend to emit photons with a certain probability when in operation. The photon generation rate is proportional to the supply voltage and the transistor switching frequency. In particular the reading of SRAM values also causes photons to be emitted. When aiming a CCD at the backside of an IC it is possible to collect information on the memory content by recording the read operations. Photonic Emission Analysis may assist other cryptanalytic methods and/or side channels.

Potentially, photo-emission attacks could be used to attack SRAM PUFs as well, e.g., to record the very first read of each PUF SRAM address. If a full read-out of the power-up memory content of the SRAM could be obtained, this would lead to a serious security problem. For example, if the recording of the photonic emission could be programmed so that it exactly captures all first reads, and nothing more from the SRAM, and repeating the measurement many times, a reliable image of the SRAM startup values could be assembled.

Scrambling of the reading order on its own would not be sufficient to counter a photonic attack: the randomization does not change the picture because the picture is simply the sum total of all initial read actions regardless of their order. Fortunately, in a read-out as in FIG. 5a and, to a lesser extent, in FIG. 5b, the read outs that are correlated to the memory content in which the memory settled into at powering-up are interspersed with write backs which are not so correlated. This will make it much harder to use photonic information. To attack this set-up an attacker may use a shutter mechanism to single out (first) read accesses. The shutter is configured in an open position during reads and in a close position during writes. In this way only the photon emission during unencrypted reads are recorded. In an embodiment, the memory read-out unit is configured to select a batch size at least partially at random, and is configured to perform a batch size number of read operations through the address scrambler followed by a batch size number of encrypted write-back operations by the encryption unit. For example, the batch size may be selected at start-up, for example, the batch size may be selected repeatedly, e.g., after each batch size read. At least partially random may be achieved by making the batch size dependent upon part of the PUF. For example, the batch size may be randomly selected from 1, 2, 3, 4 bytes.

However, it is desirable to reduce the signal that is correlated to the power-up content even further.

This can be achieved by introducing additional randomized accesses, e.g. writes and/or reads to each memory location. The writes will overwrite the initial value, and all subsequent reads will emit confusing information. To make this countermeasure more effective, the additional writes and reads per address need to be ordered randomly with respect to similar writes and reads to other addresses.

Doing additional reads and writes to the SRAM in a randomized order, generates more photonic activity that is hard to separate from the initial PUF data reads. The data used for the additional writes can be random data, a fixed pattern or even a device-specific pattern, where part of the PUF is used to derive a device-specific pattern. Also combinations of these three can be used. Randomizing this order can be based on a random seed that is itself based on a PUF startup value. The randomization makes it hard to single out first-time read accesses for all memory locations.

The scrambled read-out and encrypted write back preparation step can be enhanced to significantly hamper this attack. This is achieved by, in addition to scrambling the reading order, merging the read-out and encrypted write-back stages.

By adding additional reads of the encrypted data, e.g., reading several times from each address, and mixing first-time reads with subsequent, encrypted data reads in a randomized—e.g. based on PUF-harvested random seed—way, it is not possible for an attacker to predict the exact schedule of reads and writes as this schedule will be different for each power-up. As a result it is very hard to create a reliable picture of the SRAM startup values.

For example, the encryption phase 512 of FIG. 5c shows the same scrambled order as in FIG. 510, however additional obfuscating accesses were added. The obfuscating accesses are done by obfuscation unit, e.g. comprised in read-out unit 210. For example, the obfuscating unit may have the opportunity to insert an obfuscating accesses after each read and/or write access of the rest of unit 210. In FIG. 5c the obfuscating accesses are done only to memory locations to which an encrypted write-back already occurred.

Different types of access are advantageous. An access could be an additional read. This is simpler to implement, as it avoids the question what value needs to be written. An access could be a read/write cycle. Write accesses are more likely to cause photonic emission thus causing additional obfuscation. An access could be a read/write/write cycle; in the first write a random value or a fixed value, say all 1, or the inverse of the read value is written, then in the second write the value read is written back. This will increase switches in the memory location and further increase photonic emission. Performing an obfuscating access may thus comprise selecting a memory location, i.e. address, preferably one to which the encrypted write already occurred, and performing the access to the selected memory address.

The access could also be write access, in the latter case care must be taken that the correct value is written. A particular good tradeoff between effect and ease of implementation is shown in FIG. 5d. In FIG. 5d the encryption phase consists of multiple read/write-back cycles. The write is repeated to increase photonic effect of the encrypted (thus uncorrelated) write-back. Also in this scenario, the first write could be random, inverse, fixed. Unfortunately, FIG. 5d exhibits a regular pattern RiWiWi which makes vulnerable to single out Ri using a shutter; in an embodiment the read/write pattern is enhanced with random interleaving. For example, the number of write operations may be partially random, for example, the a batch size number may be selected, as indicated above, however the batch size number is only used to control the number of repetitions of the write-back. Other random interleaves may also be used.

Having two write backs in which the first is the inverse of the encrypted write-back increases photonic emission which reduces the effect of a possible photonic emission in the first read.

In an embodiment, the obfuscation unit is configured to perform an obfuscating access to a memory location in the memory, the obfuscating access being performed after the encryption unit wrote encrypted memory content back to the memory location. There are various ways in which the obfuscation unit may keep track of which memory locations are safe to access. In a further embodiment, the obfuscating access is before the decryption unit received encrypted memory content from the memory location.

In another embodiment, the obfuscation unit performs read accesses from a random memory location. At fixed points during the encryption phase, say after each scrambled read and after each write-back, the obfuscation unit has the opportunity to insert an obfuscating access, preferably read access, to a random memory location. The obfuscation unit comprises a probability value which indicates the probability that the obfuscation unit will insert the obfuscating access. At the start of the encryption phase the probability value is at a lower value and during at least the encryption phase the probability value increases so that at the end of the encryption phase the probability value is at a high value. For example, the probability value may increase linearly after each opportunity, from a fixed start value to a fixed end value.

At the beginning of the encryption phase only a small part of the memory has been encrypted, additional reads run the risk of improving the signal for the attacker, however in this stage the probability of a read is low, at the end a large part of the memory is encrypted, to the probability of read of an encrypted value is high. The advantage of this scheme is that no book-keeping is needed to keep track of which memory locations are safe for reading from, i.e., have an encrypted value. In an embodiment, the probability value increases linearly form 0.1 to 0.9 from start to end of the encryption phase. An embodiment of the electronic memory read-out unit for securely reading out a memory in a further order comprises any one of the obfuscation units described herein It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electronic system for generating a cryptographic key, the system comprising:
   a memory used as a physically unclonable function, the memory being writable, volatile and configured such that upon each powering-up of the memory the memory settles into a memory content which depends upon at least partially random physical characteristics of the memory, the memory being accessible through a memory interface;
   a key derivation unit—configured to derive the cryptographic key from the memory content into which the memory settled; and
   a memory read-out unit connected to the memory through the memory interface and to the key derivation unit, the memory read-out unit including:
      an address scrambler for retrieving the memory content over the memory interface in a scrambled order,
      an encryption unit for encrypting the memory, the encryption unit being configured to receive from the memory interface the memory content in the scrambled order, encrypt the received memory content and write hack the encrypted memory content to the memory, and a decryption unit for decrypting the memory, configured to receive from the memory interface the encrypted memory content in a linear or sequential pre-determined further order, decrypt the received encrypted memory content to obtain the memory content in the further order.

2. The electronic system as in claim 1, further comprising
a non-volatile helper-data memory, the helper-data memory storing helper data constructed for the memory used as a physically unclonable function,
a combiner for establishing a correctable bit-string, the correctable bit-string lying in a correctable neighborhood of an error correcting code, the combiner being configured to retrieve the helper data from the helper-data memory and to combine the retrieved helper data with the memory content into which the memory settled in the pre-determined further order obtained from the memory read-out unit, and
an error-corrector—configured to establish a code word of an error correcting code from the correctable bit-string using an error correcting algorithm.

3. The electronic system as in claim 2, wherein:
the memory content is partitioned into code-word sized memory chunks, the error-corrector being configured to establish multiple code words from the correctable bit-string, each of the chunks being error corrected independently of the other chunks, and
the address scrambler is configured to generate a sequence of memory addresses of memory in a scrambled order, the sequence of memory addresses comprises multiple code sequences of sequential memory addresses corresponding to the memory chunks, the address scrambler generating the sequence of address such that each one of the multiple code sequences is generated together without being interleaved by addresses of a different one of the multiple code sequence.

4. The electronic system as in claim 1, wherein the encryption unit is configured to write back the encrypted memory content to the memory in the scrambled order thereby overwriting the memory content with the encrypted memory content.

5. The electronic system as in claim 1, wherein the scrambled order is derived from a seed at least partially randomly generated after each power-up of the read-out unit.

6. The electronic system as in claim 5, wherein the read-out unit comprises a cryptographic one-way function configured to be applied to the seed to obtain a new seed, the address scrambler being configured to derive a new scrambled order from the new seed for re-fetching the memory content over the memory interface in the new scrambled order.

7. The electronic system as in claim 5, wherein the read-out unit comprises a further volatile memory configured such that upon each powering-up of the further memory the second memory settles into a noisy memory content, the seed being derived from the memory content into which the second memory settled.

8. The electronic system as in claim 1, further comprising an obfuscation unit, the obfuscation unit being configured to perform a number of additional obfuscating accesses to the memory, the obfuscating access being configured to reduce the correlation between photo-emissions from the memory and memory content in which the memory settled into at powering-up.

9. The electronic system as in claim 8, wherein the obfuscation unit is configured to perform an obfuscating access to a memory location in the memory, the obfuscating access being performed after the encryption unit wrote encrypted memory content back to the memory location.

10. The electronic system as in claim 1, wherein the memory used as a physically unclonable function is an SRAM memory.

11. The electronic system as in claim 1, wherein the memory used as a physically unclonable function is volatile FPGA memory.

12. The electronic system as in claim 1, comprised in an integrated circuit.

13. The electronic system as in claim 12, wherein the integrated circuit is any one of a smart card, an ASSP, DSP, Application processor, SIM and NFC chip.

14. An electronic memory read-out unit for securely reading out a memory in a linear or sequential pre-determined further order, the memory being writable, the electronic memory read-out unit being connectable to the memory through a memory interface, the electronic memory read-out unit comprising:
an address scrambler configured to retrieve the memory content over the memory interface in a scrambled order,
an encryption unit for encrypting the memory, the encryption unit being configured to receive from the memory interface the memory content in the scrambled order, encrypt the received memory content and write back the encrypted memory content, and
a decryption unit for decrypting the memory, configured to receive from the memory interface the encrypted memory content in the further order, decrypt the received encrypted memory content to obtain the memory content in the further order.

15. A method for generating a cryptographic key, the method comprising:
powering-up of a memory used as a physically unclonable function, the memory being writable and volatile,
allowing the memory to settle into a memory content which depends upon at least partially random physical characteristics of the memory,
retrieving the memory content over a memory interface in a scrambled order,
encrypting the memory by:
receiving from me memory interface the memory content in the scrambled order,
encrypting the received memory content, and
writing back the encrypted memory content to the memory,
decrypting the memory by:
receiving from the memory interface the encrypted memory content in a linear or sequential pre-determined further order, and
decrypting the received encrypted memory content to obtain the memory content in the pre-determined further order; and
deriving a cryptographic key from the memory content into which the memory settled.

16. A non-transitory tangible computer readable storage medium comprising data loadable in a programmable apparatus, the data representing instructions executable by the programmable apparatus, said instructions being arranged to execute a method for generating a cryptographic key, the method comprising:
powering-up of a memory used as a physically unclonable function, the memory being writable and volatile,
allowing the memory to settle into a memory content which depends upon at least partially random physical characteristics of the memory, retrieving the memory content over a memory interface in a scrambled order,
encrypting the memory by:
   receiving from me memory interface the memory content in the scrambled order,
   encrypting the received memory content, and
   writing back the encrypted memory content to the memory,
decrypting the memory by:
   receiving from the memory interface the encrypted memory content in a linear or sequential pre-determined further order, and
   decrypting the received encrypted memory content to obtain the memory content in the pre-determined further order; and
deriving a cryptographic key from the memory content into which the memory settled.

* * * * *